US006725976B2

(12) United States Patent
Oh et al.

(10) Patent No.: US 6,725,976 B2
(45) Date of Patent: Apr. 27, 2004

(54) MANUAL OVERRIDE AND LOCKING MECHANISM AND ACTUATOR INCLUDING SAME

(75) Inventors: Michael Hung-Sun Oh, Rockford, IL (US); Gerald R. Parsons, Caledonia, IL (US)

(73) Assignee: Invensys Building Systems Inc., Loves Park, IL (US)

( * ) Notice: Subject to any disclaimer, the term of this patent is extended or adjusted under 35 U.S.C. 154(b) by 128 days.

(21) Appl. No.: 10/101,681

(22) Filed: Mar. 20, 2002

(65) Prior Publication Data

US 2003/0178257 A1 Sep. 25, 2003

(51) Int. Cl.[7] .................................................. F03G 1/00
(52) U.S. Cl. ...................... 185/40 B; 185/40 R; 185/39
(58) Field of Search ............................... 185/37, 38, 39, 185/40 R, 40 B, 9, 10, 11; 137/556, 15.01

(56) References Cited

U.S. PATENT DOCUMENTS

| 4,333,489 A | * | 6/1982 | Magill et al. ................. 137/77 |
| 4,416,611 A | * | 11/1983 | Zivny ........................... 431/20 |
| 4,545,363 A | * | 10/1985 | Barchechat et al. ...... 126/285 B |
| 4,581,987 A | | 4/1986 | Ulicny |
| 4,595,081 A | | 6/1986 | Parsons |
| 5,310,021 A | | 5/1994 | Hightower |

FOREIGN PATENT DOCUMENTS

EP 0903522 A 3/1999

* cited by examiner

Primary Examiner—David Fenstermacher
(74) Attorney, Agent, or Firm—Leydig, Voit & Mayer, Ltd.

(57) ABSTRACT

A manual override mechanism is presented for a motor driven rotary actuator that allows the output of the actuator to be manually positioned. Once positioned, the output of the actuator may be locked by a locking mechanism to prevent this output from rotating to its quiescent position. When incorporated in a spring return rotary actuator, the manual override may be used to apply a preload on the spring before the driven device is connected. When the actuator is used to drive a valve or damper, the preload applies a positive closing force on the damper in its zero position to ensure a tight closure of the valve or damper. The locking mechanism engages the gear train and opposes the closing force applied by the spring return of the actuator. To disengage the locking mechanism automatically, the motor applies a forward kick to the gear train. Manual disengagement is also provided.

19 Claims, 6 Drawing Sheets

MANUAL OVERRIDE AND LOCKING MECHANISM AND ACTUATOR INCLUDING SAME

FIELD OF THE INVENTION

The present invention relates generally to motor driven reversible actuator mechanisms, and more particularly to mechanisms that allow the manual setting of the position of motor driven reversible actuator mechanisms.

BACKGROUND OF THE INVENTION

Motor driven actuator mechanisms for use in controlling the position of valves, dampers, etc. typically include a motor that drives an output coupling in one direction through a gear train to position the valve, damper, etc. in a desired position. Spring type or fail safe actuator mechanisms also typically include a torsion spring coupled to the gear train that is wound during energization of the motor. In this way, energy for rotating the shaft in the other direction when the motor is de-energized is stored in the spring. Upon loss of power to the motor, the torsion spring unwinds, driving the gear train to position the valve, damper, etc. in a desired or fail safe position. Such actuator mechanisms are described in U.S. Pat. No. 5,310,021, entitled Motor-Driven, Spring-Returned Rotary Actuator and U.S. Pat. No. 4,595,081 entitled Reversible Rotary Actuator With Spring Return, both of which are assigned to the assignee of the instant application, the teachings and disclosures of which are incorporated in their entireties herein by reference thereto.

In such rotary actuators the motor rotates the output shaft and winds the spring by way of a gear train which substantially reduces the speed and substantially amplifies the torque of the motor. When the spring unwinds to rotate the output shaft, the spring acts reversely through the gear train and backdrives the motor shaft. An actuator of this type is frequently used to drive a utilization device such as a damper in the duct of a heating, ventilating and cooling system. When the motor is de-energized, the spring drives the output shaft in a direction moving the damper to a closed position against a fixed stop. The effectiveness of the seal of the damper against this fixed stop is somewhat a function of the amount of spring force remaining in the torsion spring when the damper encounters the stop. If this position is reached when the spring has released all of its stored energy, the quality of the seal against the stop is determined solely on the quiescent mechanical contact between these two surfaces, taking into account the mechanical connection to the motor through the gear train.

While such contact between the damper and the fixed stop may be adequate to stop flow through the damper for many installations, certain installations may require that the seal between the damper and the stop be positively held. That is, there are some installations that require that the damper be able to remain positively closed with increased pressure. Such positive closing force against the fixed stop is particularly desirable in higher pressure installations and in valve operations. Indeed, nearly all installations could benefit from such a positive closing force imparted by the spring to ensure the integrity of the closed position.

To provide such a positive closing force on the damper, valve, etc. driven by the spring return actuator, the output coupling of the actuator is often rotated a few degrees before being connected to the drive shaft of the driven device (e.g., damper, valve, etc.). Such rotation of the output coupling winds the spring to establish a preload. Once a spring preload is established, the output coupling of the actuator is connected to the drive shaft of the driven device that is positioned in its closed or failsafe position (referred to herein as the zero position). Once connected, the spring impart the positive preload force on the driven device at its zero position.

Unfortunately, since the output coupling of the actuator is coupled through a torque multiplying gear train, rotation of this output coupling by hand is somewhat difficult. Further, since the return spring also acts through the torque multiplying gear train, holding the output coupling at the preload position while trying to connect this output coupling to the drive shaft of the driven device is also quite difficult.

BRIEF SUMMARY OF THE INVENTION

In view of the above, the present invention is directed to a new and improved spring return rotary actuator that includes a manual override that allows the imparting of a preload on the return spring in a simple and effective manner. Further, the invention is directed to a new and improved spring return rotary actuator having such a manual override that includes a locking mechanism capable of locking the output coupling from rotating under influence of the return spring.

A rotary actuator in accordance with one embodiment of the present invention comprises a motor, a gear train, and an output coupling driven by the motor through the gear train. The gear train multiplies the torque of the motor to drive the output coupling. A manual override mechanism having a user accessible interface is also included. The manual override mechanism operates in conjunction with the gear train to allow manual positioning of the output coupling. Further, a manual locking mechanism having a user accessible interface is also included. This manual locking mechanism engages the gear train to prevent rotation of the output coupling in a first direction.

Preferably, the actuator further comprises a spring return mechanism including a torsion spring coupled to the gear train. This torsion spring is wound upon energization of the motor driving the output coupling in a second direction and is unwound upon de-energization of the motor to drive the output coupling through a portion of the drive train in the first direction. The manual override mechanism is coupled through the torsion spring such that operation of the manual override to effect a rotation of the output coupling in the second direction winds the torsion spring. In a preferred embodiment the manual locking mechanism includes a segment gear head having a toothed portion and a smooth portion on its face. The segment gear head is rotatable between a locked position wherein the toothed portion engages the gear train preventing rotation of the output coupling in the first direction, and an unlocked position wherein the smooth portion is positioned in association with the gear train and the toothed portion is disengaged from the gear train.

Further, the manual locking mechanism preferably includes a reset lock spring operatively coupled to the segment gear head to bias the segment gear head to the unlocked position. The segment gear head also includes a slot adapted to accommodate a stop pin. This stop pin abuts against a first end of the slot in the unlocked position and against a second end of the slot in the locked position. Rotation at a point of engagement with the locking mechanism of the gear train under influence of the torsion spring is in a direction to rotate the segment gear head against the reset lock spring force. This maintains the manual locking mechanism in the locked position. Rotation at a point of engagement with the locking mechanism of the gear train under influence of the motor is in a direction to rotate the segment gear head in accord with the reset lock spring force. This aids the manual locking mechanism to achieve the unlocked position. Preferably, the motor drives the output coupling in a second direction to disengage the locking mechanism from the gear train to allow rotation of the output coupling in the first direction.

In an alternate embodiment of the present invention, a locking mechanism for a motor driven rotary actuator having a gear train drivably coupling a motor to an output coupling to drive a device is provided. This locking mechanism comprises a segment gear head having a toothed portion and a smooth portion on its face. The toothed portion is configured to engage a gear in the gear train. The segment gear head is positioned in relation to the gear such that rotation of the segment gear head between a locked position and an unlocked position results in engagement of the toothed portion with the gear in the locked position and disengagement of the toothed portion in the unlocked position. The segment gear head further includes a slot adapted to accommodate a stop pin, and is positioned in the segment gear head such that the stop pin abuts against a first end of the slot in the unlocked position and against a second end of the slot in the locked position. A reset lock spring is operably coupled to the segment gear head to bias the segment gear head to the unlocked position. Further, a user interface is coupled to the segment gear head to rotate the segment gear head between the locked and the unlocked positions.

In a preferred embodiment the toothed portion of the segment gear head occupies approximately 25°. Further, the toothed portion is preferably positioned in relation to the slot such that rotation of the gear train at a point of engagement with the locking mechanism is in a direction to rotate the segment gear head such that the stop pin engages the second end. Additionally, the reset lock spring preferably is positioned such that engagement of the toothed portion of the segment gear head with the gear train when the actuator is driving the device to a closed position results in rotation of the segment gear head against the bias applied by the reset lock spring.

In yet a further alternate embodiment of the present invention, a spring return, motor driven rotary actuator for driving a flow control device to an open position under power and to a closed position upon loss of power is presented. This actuator comprises a motor, a speed reducing, torque multiplying gear train drivingly coupled to an output of the motor, and an output coupling drivingly coupled to the gear train. This output coupling is driven in a first direction by the motor. A spring return mechanism including a torsion spring coupled to the gear train is also included. The torsion spring is wound upon energization of the motor driving the output coupling in the first direction, and unwinds upon motor de-energization to drive the output coupling through the drive train in a second direction. A manual override mechanism having a first user accessible interface is provided that operates in conjunction with the spring return mechanism to allow manual positioning of the output coupling and winding of the torsion spring. Finally, a manual locking mechanism having a second user accessible interface is also provided. This manual locking mechanism engages the gear train to prevent rotation of the output coupling in the second direction.

In one embodiment the manual locking mechanism includes a segment gear head having a toothed portion on its face, and is rotatable between a locked position wherein the toothed portion engages the gear train preventing rotation of the output coupling in the second direction, and an unlocked position wherein the toothed portion is disengaged from the gear train. The manual locking mechanism further includes a reset lock spring operatively coupled to the segment gear head to bias the segment gear head to the unlocked position. Additionally, the segment gear head includes a slot adapted to accommodate a stop pin, which abuts against a first end of the slot in the locked position to prevent further rotation of the segment gear head. Further, rotation of the gear train at a point of engagement with the locking mechanism under influence of the torsion spring is in a direction to rotate the segment gear head against the reset lock spring force thereby maintaining the manual locking mechanism in the locked position. Rotation of the gear train at a point of engagement with the locking mechanism under influence of the motor is in a direction to rotate the segment gear head in accord with the reset lock spring force thereby aiding the manual locking mechanism to achieve the unlocked position. Preferably, the motor kicks the output coupling in the first direction to disengage the locking mechanism from the gear train to allow rotation of the output coupling in the second direction.

Other features and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention, and together with the description serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
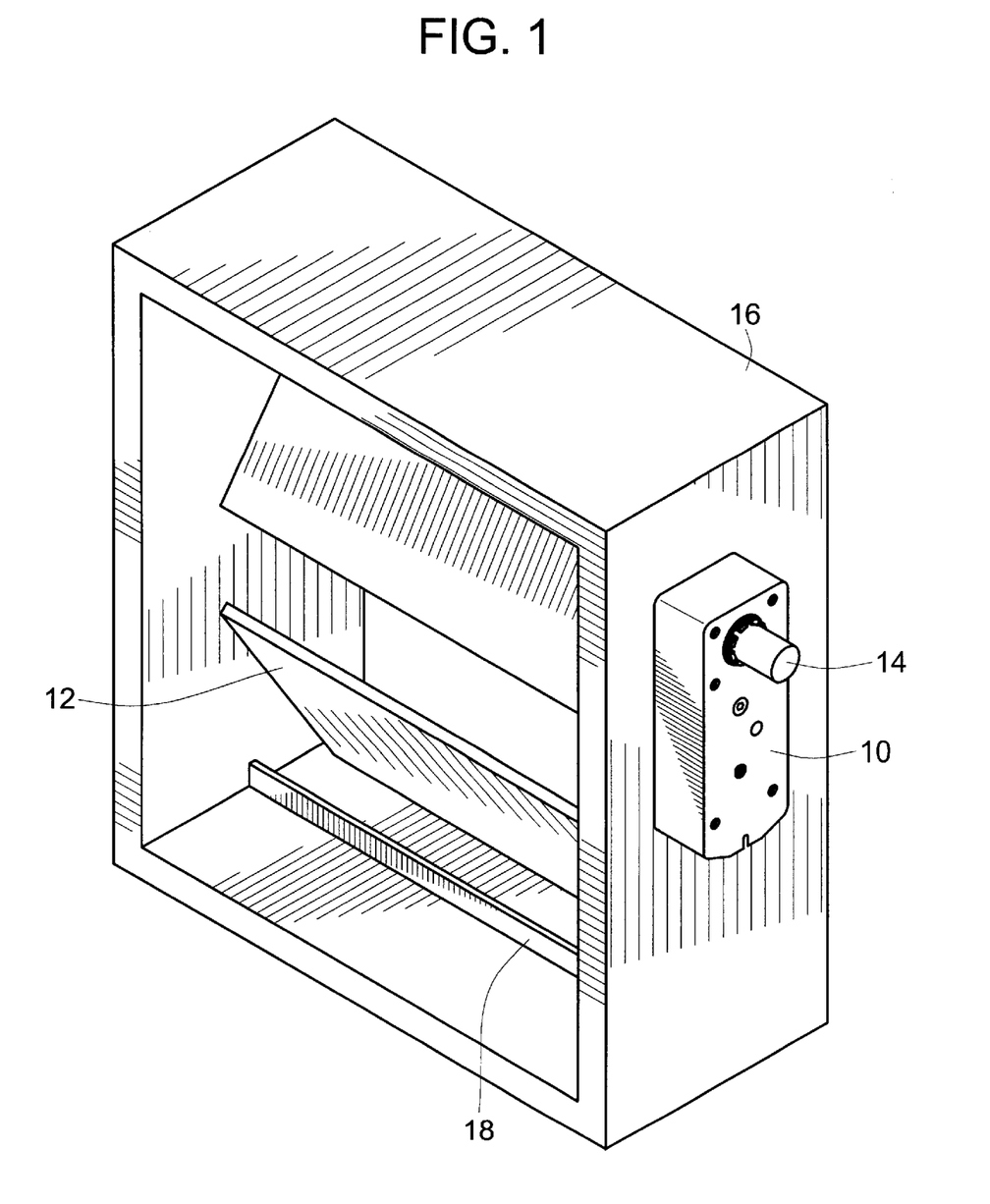
FIG. 1 is a simplified perspective view of a spring return rotary actuator constructed in accordance with the teachings of the present invention installed to drive a damper for use in the duct of a heating, ventilating and cooling (HVAC) system.

As illustrated in FIG. 1, an embodiment of the present invention is embodied in a reversible rotary actuator 10 for controlling the position of a utilization device 12. In this exemplary embodiment, the utilization device 12 has been shown as being a damper located in a heating, ventilating and air conditioning (HVAC) duct 16 and mounted on a shaft 14 for turning through approximately 90 degrees between a fully closed upright position and a fully open horizontal position. The damper in this embodiment is closed and opened when the shaft 14 is rotated clockwise and counterclockwise, respectively. When the damper reaches its fully closed position, it hits against a fixed stop 18 which has been shown schematically in FIG. 1 as being located within the duct 16.

Figure 2:
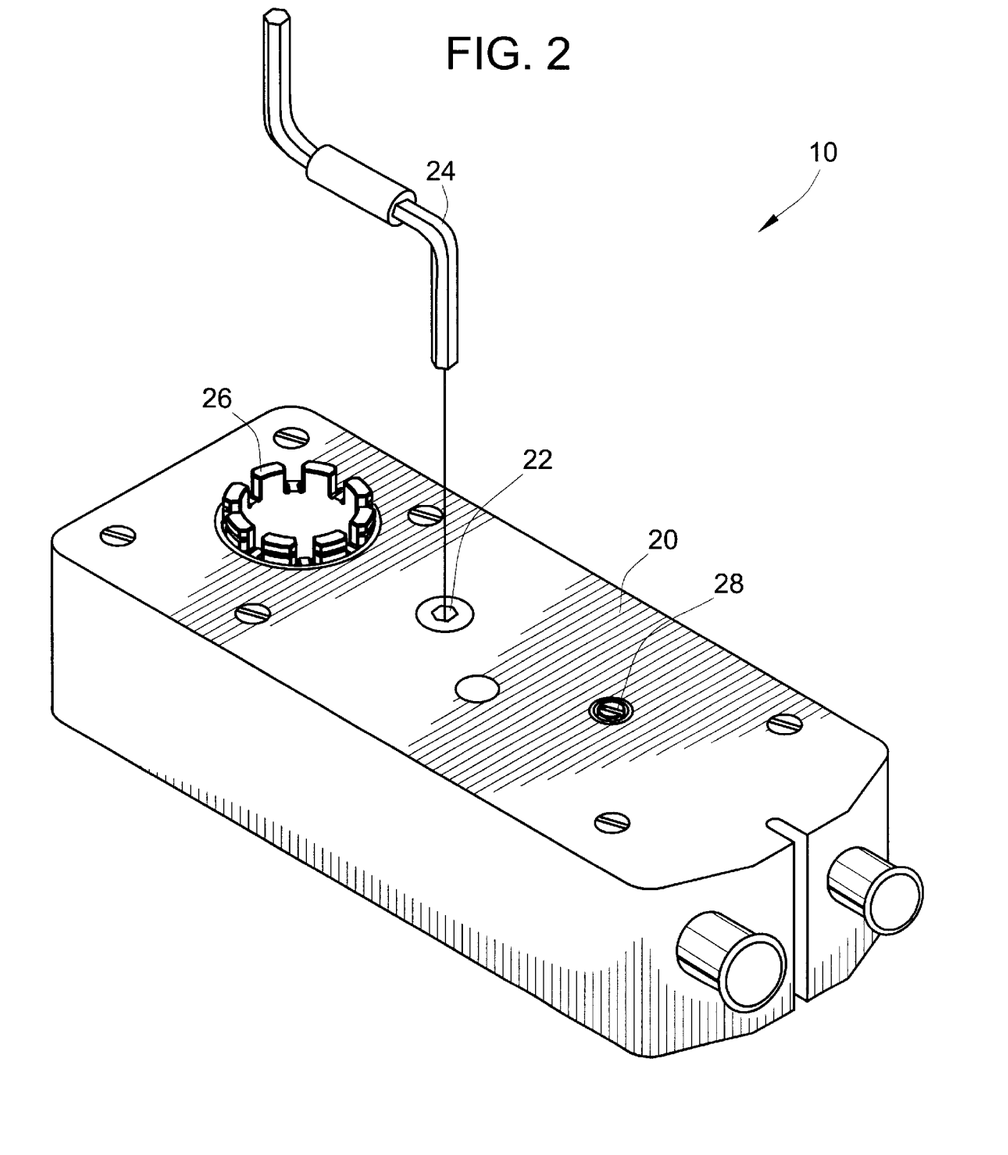
FIG. 2 is a simplified perspective view of the actuator of FIG. 1 enlarged to show detail of the interface for the manual override and locking mechanisms of the present invention.

As may be seen from the enlarged view of the actuator 10 of the present invention illustrated in FIG. 2, the housing 20 of the actuator 10 includes a manual override interface 22 adapted to receive a spring winding tool 24. Through the use of this tool, a user may wind the torsion spring that returns the output coupling 26 of the actuator 10 to its zero position once power is removed from the motor. As discussed above, winding the torsion spring stores energy in the spring that may be applied as a preload once the output shaft 14 (see FIG. 1) is coupled to the output coupling 26. Once the preload has been applied to the spring, the user may manually lock the actuator 10 via interface 28 to prevent the spring from returning to its quiescent state. Once locked in place, the actuator 12 is placed in its zero position and its output shaft 14 is coupled to the output coupling 26 of the actuator 10. The user may then unlock the actuator 10 by moving the locking interface 28 to its unlocked position, or may simply allow the automatic control of the actuator to unlock the lock during operation as will be discussed more fully below.

Figure 3:
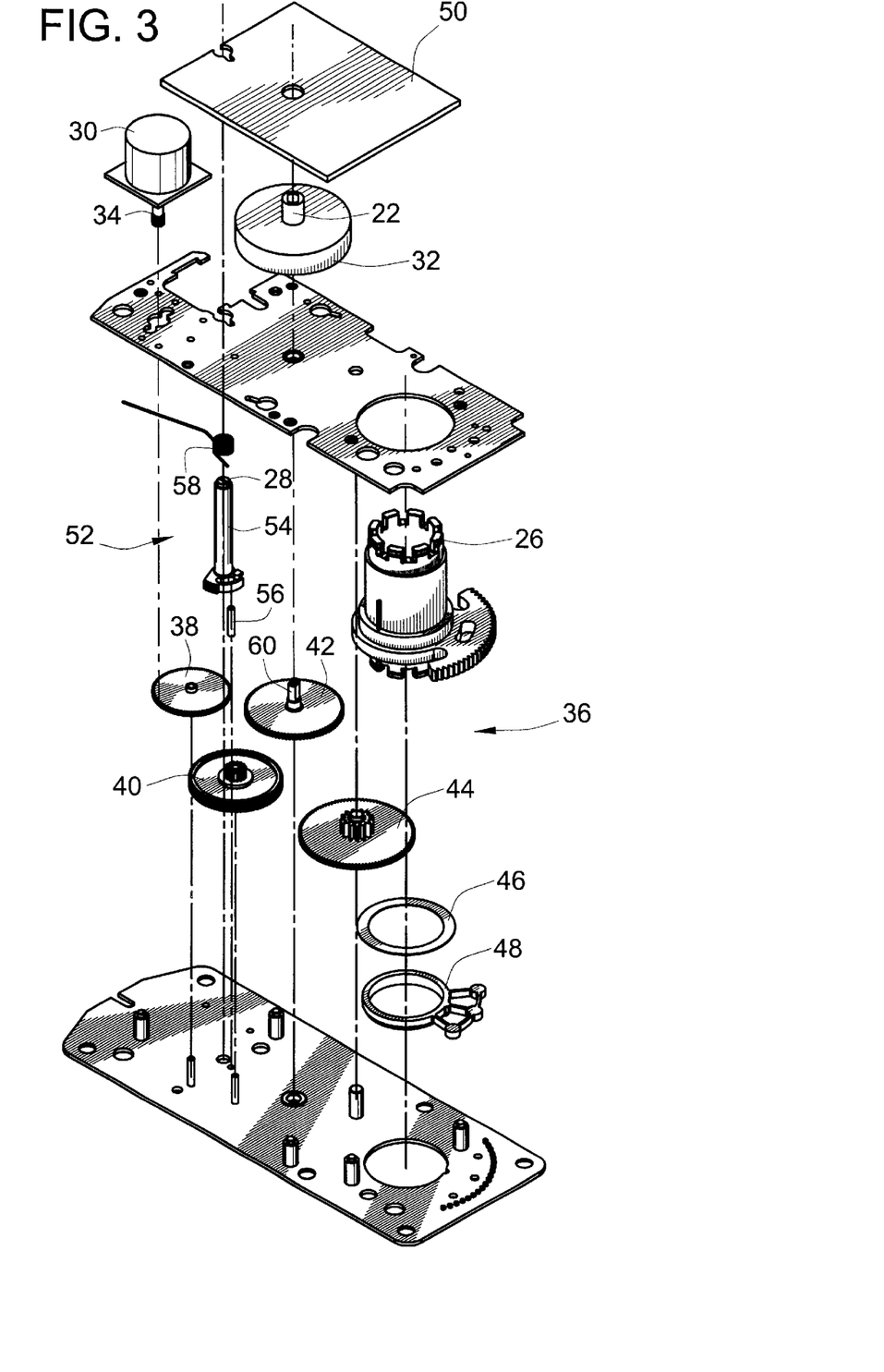
FIG. 3 is a simplified exploded perspective view of the interior of an actuator constructed in accordance with the teachings of the present invention.

As discussed above, the actuator 10 includes a housing 20 secured to the outer side of one of the side walls of the duct 16 and rotatably journaling one end portion of the damper output shaft 14. Driving of the output shaft 14 in a counterclockwise direction to open the damper 12 is effected by a relatively low torque and selectively energizable electric motor 30 located in the housing 20 as illustrated in FIG. 3 to which specific reference is now made. As the output shaft 14 is rotated counterclockwise, a torsion spring 32 is loaded or wound and serves to rotate the shaft 14 in a clockwise direction in order to close the damper 12 when the motor 20 is de-energized. The placement of the spring 32 within the gear train not only optimizes the torque multiplication of the spring force to return the damper to its zero or fail safe condition, but also greatly reduces the torque required to apply the manual preload.

Figure 4:
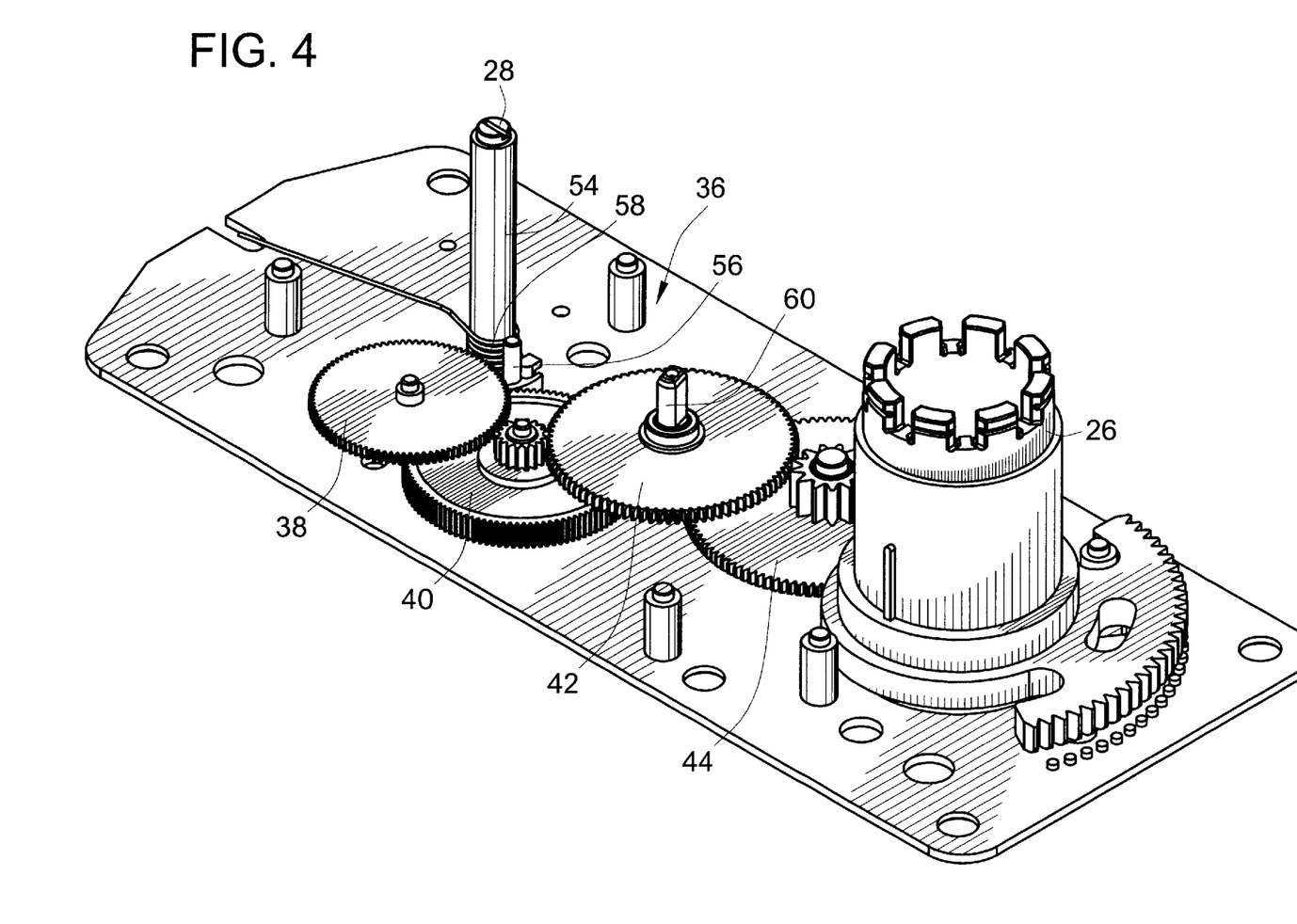
FIG. 4 is a perspective view of the gear train assembly of the actuator of FIG. 3.

The motor 30 includes a drive shaft 34 and, as mentioned above, is of relatively low torque. The drive shaft 34 of the motor is connected to the output coupling 26 by a drive or gear train 36, which causes the output coupling 26 to rotate at a substantially slower speed than the motor drive shaft 34 and to be capable of exerting substantially higher torque than the motor drive shaft 34. In this instance, the gear train 36 includes four gears and pinions 38–44 in driving relationship with one another to multiply the torque from the motor while substantially reducing the speed at which the output coupling 26 is driven. A small thrust washer 46 and an output bearing 48 are also included in relation to the output coupling 26. The drive train in its assembled form is illustrated in FIG. 4, which more clearly shows the relationship between the individual gears.

To explain the operation of the actuator 10 as described thus far, assume that the damper 12 is in its closed or zero position and that the motor 30 is de-energized. Now assume that a control signal from controller board 50 causes the motor 30 to be energized so as to effect rotation of the motor drive shaft 34. That shaft acts through the gear train 36 to rotate the output coupling 26 to swing the damper 12 toward its open position and, at the same time, to wind the torsion spring 32. The damper opens until it reaches it fully open position, at which time the motor remains energized but goes to a holding condition. In this way the damper is held at its fully open position by the motor against the force of the spring 32.

Now assume that the motor 30 is de-energized, either by a control signal from the controller board 50 or by loss of electrical power during. Upon de-energization of the motor 30, the torsion spring 32 unwinds and rotates the output coupling 26 in a reverse direction to place the damper 12 in a known fail-safe state. In the embodiment illustrated, the torsion spring 32 operates to close the damper 12. When the damper closes fully and hits the stop 18 (see FIG. 1) at its zero position, the spring continues to apply the preload force through the gear train 36, which ensures a positive closing force continues to be applied on the damper 12.

As discussed above, the application of the preload on the spring 32 is accomplished via the manual override interface 22. It should be noted that this manual override may also be used to position or open the damper manually in the event of a loss of power to facilitate servicing or repair of the damper. In either event, whether the manual override is employed to impart a preload force into the spring 32 or to position or open the damper manually, the normal functionality of the spring 32 and the gear train 36 that wants to return the damper to its zero position can be locked out via the locking mechanism 52.

This locking mechanism 52 also operates in conjunction with the gear train 36 to prevent the spring 32 from returning the damper to its zero position. As may be seen most clearly from FIG. 3, the locking mechanism 52 includes reset lock member 54, a stop pin 56, and a reset lock spring 58. As shown in FIG. 4, the locking mechanism 52 operates in conjunction with the gear train at a point such that the breaking force applied is multiplied through the gear train to prevent rotation of the output coupling 26. Preferably, the location of the locking mechanism is upstream of the interface 60 between the gear train and the spring 32, a position of higher speed and lower torque rotation.

Figure 5:
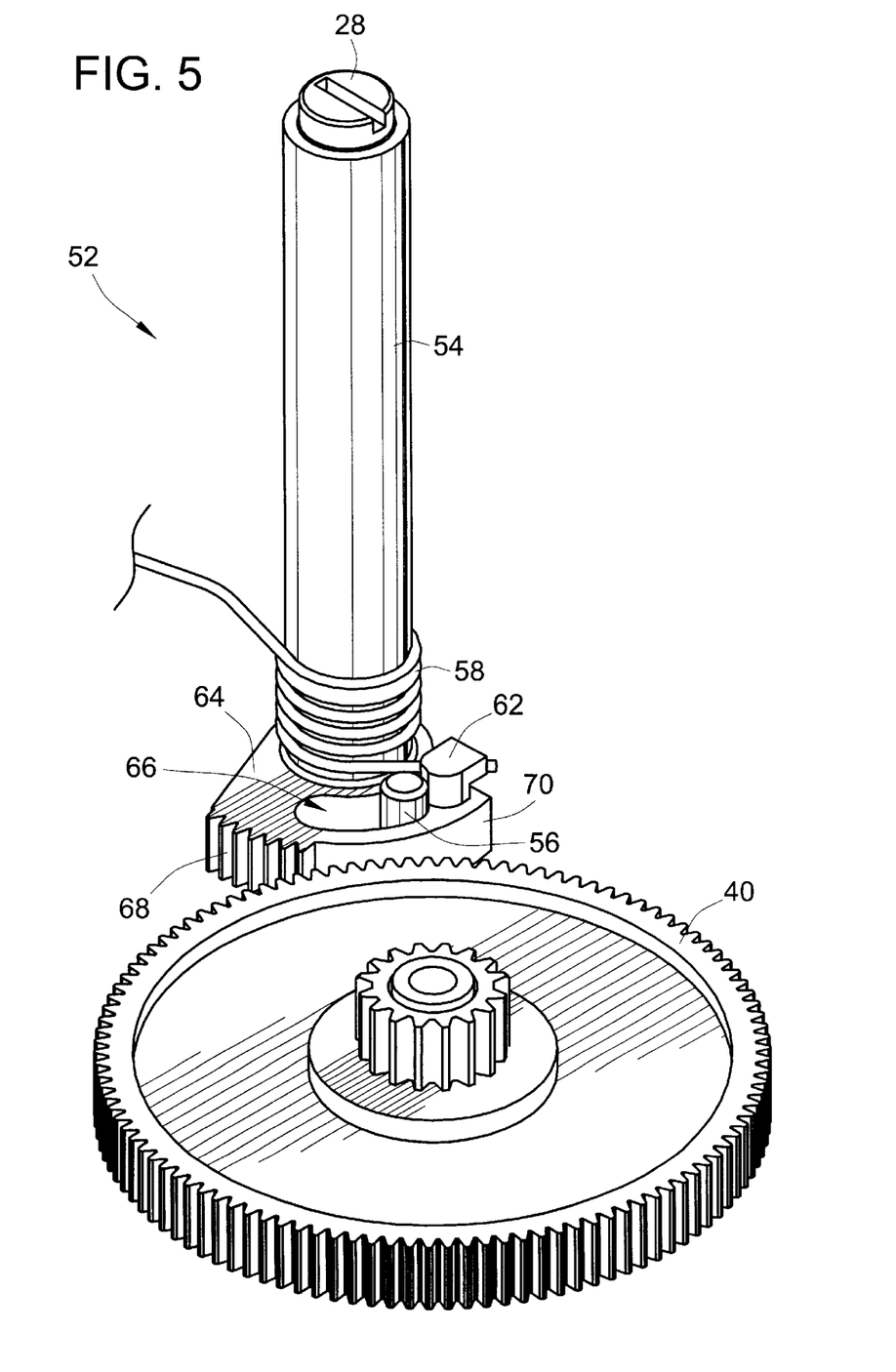
FIG. 5 is an isolated perspective view of an embodiment of the locking mechanism of the present invention in an unlocked position.
Figure 6:
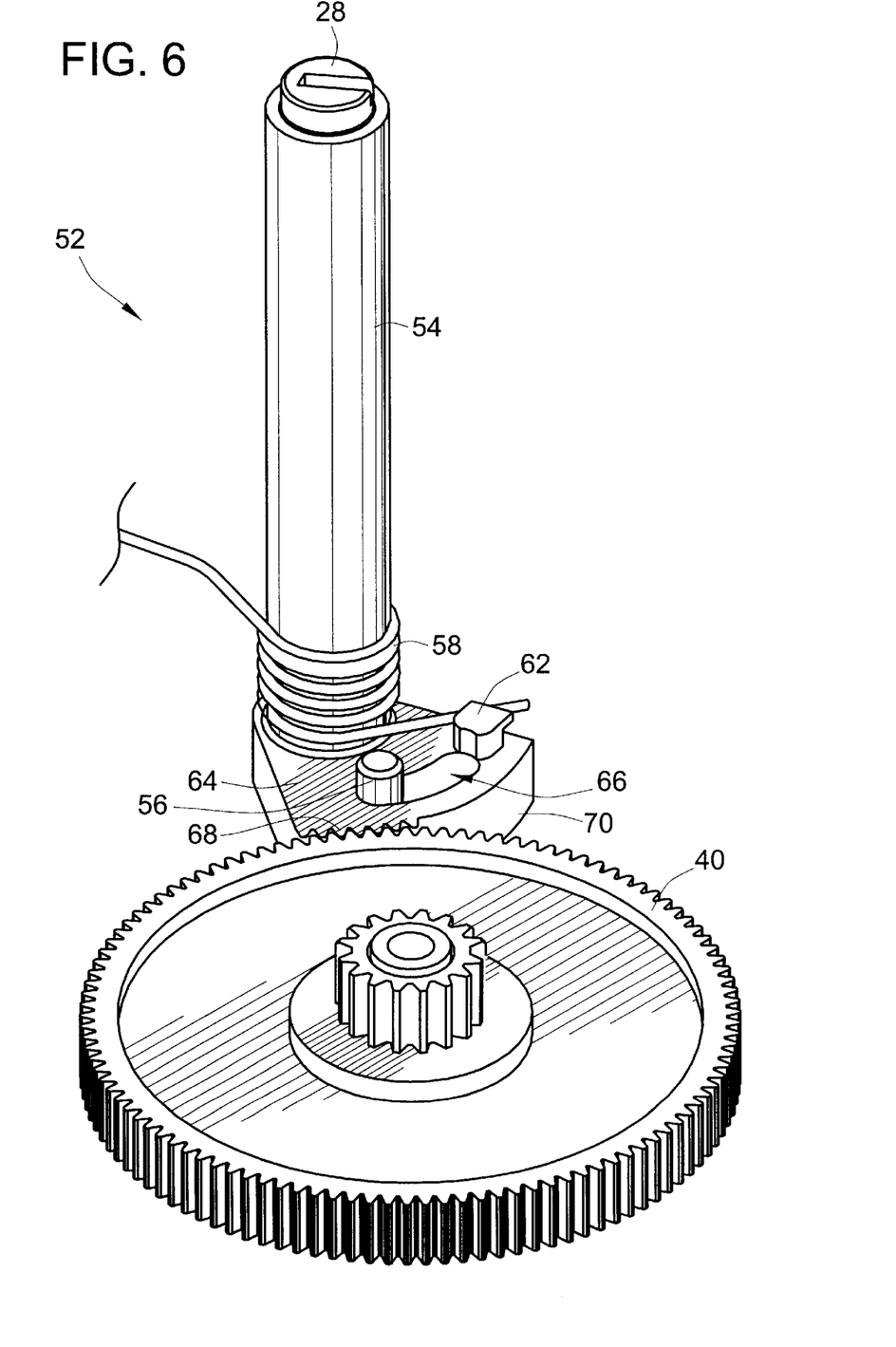
FIG. 6 is an isolated perspective view of the locking mechanism of FIG. 5 in a locked position.

The operation of the locking mechanism 52 may best be understood through an examination of FIGS. 5 and 6. In FIG. 5 the locking mechanism 52 is illustrated in its quiescent unlocked position. In this position the reset lock spring 58 applies a force on the spring receiver 62. This force biases the segment gear head 64 in a clockwise direction such that it is rotated until stop pin 56 contacts the end of the slot 66. The face of the segment gear head 64 includes a toothed portion 68 and a smooth portion 70. In one embodiment, the toothed portion 68 occupies approximately 25°, although this may be varied depending on the tooth pattern and spacing of the gear 40 which the toothed portion 68 engages. That is, a number of teeth sufficient to hold the gear against the force applied by the spring 32 must be provided. In the unlocked position illustrated in FIG. 5, the reset lock spring 58 maintains the smooth portion 70 in association with the gear 40 so that this gear 40 may freely rotate in either direction. In the embodiment illustrated, rotation of the gear 40 in a counterclockwise direction relates to the opening of the damper 12, which rotation of the gear 40 in a clockwise direction closes the damper 12. It is noted that such clockwise rotation of gear 40 results from action of the spring 32 to close the damper upon a loss of power.

In FIG. 6, the locking mechanism 52 is illustrated in its locked position. In this locked position, rotation of the gear 40 in the clockwise direction is prevented by the stop pin 56, which has contacted the end of slot 66. This locked position is held by the force of the spring 32 acting through the gear train against the force of the reset lock spring 58, which is biased to rotate toothed portion 68 of the segment gear head 64 out of engagement with gear 40. Since gear 40 is prevented from further clockwise rotation under force of the spring 32, this locks the rest of the gear train 36 and prevents rotation of the output coupling 26. As such, the damper 12 is prevented from closing under force of the spring 32. In the initial installation of the actuator 10, this locking of the output coupling is used once a preload is manually added to the spring 32 via interface 22 shown in FIG. 2. Once the preload is applied and the output coupling 26 locked, the output shaft 14 of the damper 12 is coupled to the output coupling 26 of the actuator 10 with the damper positioned at its zero position as discussed above with regard to FIG. 1.

Once the locking mechanism 52 has been engaged, it may be disengaged manually by using the tool 24 to rotate the interface 22 in the direction to wind the spring 32. In the embodiment illustrated, the user need rotate the interface 22 by an amount sufficient to rotate the gear 40 approximately 10° minimum to disengage the lock. Once this occurs, the reset lock spring 58 will bias the segment gear head in the clockwise direction until the stop pin 56 contacts the end of the slot 66 as illustrated in FIG. 5. Once the locking mechanism 52 is disengaged, the gear train 36 is free to rotate in either direction to open the damper 12 under control of the motor 30 and to close the damper 12 under control of the spring 32.

Alternatively, the locking mechanism 52 may be disengaged automatically under control of the control board 50 and the motor 30. That is, if the control board wishes to unlock the locking mechanism 52 or wishes to command a closure of the damper 12, it controls the motor 30 to kick in a drive direction, i.e. drive the output shaft in a direction to open the damper, just enough to ensure that the gear 40 rotates counterclockwise an amount sufficient to disengage the toothed portion 68 of the segment gear head 64. As discussed above, once the toothed portion 68 disengages the gear 40, the reset lock spring 58 will bias the locking mechanism 52 into its unlocked position. Since the position of the locking mechanism 52 in relation to the gear train 36 is nearer the motor, and thus nearer the high speed low torque portion of the gear train 36, this slight rotation of the gear train 36 sufficient to unlock the locking mechanism 52, does not impart any significant movement on the damper. Indeed, even if the damper 12 were in its fully open position when the locking mechanism 52 was engaged, the motor 30 would be able to unlock the locking mechanism 52.

All of the references cited herein, including patents, patent applications, and publications, are hereby incorporated in their entireties by reference.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. Indeed, while the above description utilized a spring-return actuator to illustrate the features of the invention, one skilled in the art will recognize that the manual override and locking mechanism are equally applicable to non-spring return actuators as well. In such an application, the manual override is used to manually position the damper as opposed to winding a spring. All such modifications and variations are within the scope of the invention as determined by the appended claims when interpreted in accordance with the breadth to which they are fairly, legally, and equitably entitled.

What is claimed is:

1. A rotary actuator, comprising:
    a motor;
    a gear train;
    an output coupling driven by the motor through the gear train, the gear train multiplying the torque of the motor to drive the output coupling;
    a manual override mechanism having a first user accessible interface, the manual override mechanism operating in conjunction with the gear train to allow manual positioning of the output coupling; and
    a manual locking mechanism having a second user accessible interface, the manual locking mechanism engaging the gear train to prevent rotation of the output coupling in a first direction; and
    a spring return mechanism including a torsion spring coupled to the gear train, the torsion spring being wound upon energization of the motor driving the output coupling in a second direction, the torsion spring unwinding upon de-energization of the motor to drive the output coupling through a portion of the drive train in the first direction.

2. The actuator of claim 1, wherein the motor drives the output coupling in a second direction to disengage the locking mechanism from the gear train to allow rotation of the output coupling in the first direction.

3. The actuator of claim 1, wherein the manual override mechanism is coupled through the torsion spring such that operation of the manual override to effect a rotation of the output coupling in the second direction winds the torsion spring.

4. The actuator of claim 1, wherein the manual locking mechanism includes a segment gear head having a toothed portion and a smooth portion on a face thereof, the segment gear head being rotatable between a locked position wherein the toothed portion engages the gear train preventing rotation of the output coupling in the first direction, and an unlocked position wherein the smooth portion is positioned in association with the gear train and the toothed portion is disengaged from the gear train.

5. The actuator of claim 4, wherein the manual locking mechanism further includes a reset lock spring operatively coupled to the segment gear head to bias the segment gear head to the unlocked position.

6. The actuator of claim 5, wherein the segment gear head includes a slot adapted to accommodate a stop pin therethrough, the stop pin abutting against a first end of the slot in the unlocked position and abutting against a second end of the slot in the locked position.

7. The actuator of claim 5, wherein rotation at a point of engagement with the locking mechanism of the gear train under influence of the torsion spring is in a direction to rotate the segment gear head against the reset lock spring force thereby maintaining the manual locking mechanism in the locked position.

8. The actuator of claim 5, wherein rotation at a point of engagement with the locking mechanism of the gear train under influence of the motor is in a direction to rotate the segment gear head in accord with the reset lock spring force thereby aiding the manual locking mechanism to achieve the unlocked position.

9. A locking mechanism for a motor driven rotary actuator having a gear train drivably coupling a motor to an output coupling to drive a device, comprising:
- a segment gear head having a toothed portion and a smooth portion on a face thereof, the toothed-portion configured to engage a gear in the gear train, the segment gear head being positioned in relation to the gear such that rotation of the segment gear head between a locked position and an unlocked position results in engagement of the toothed portion with the gear in the locked position and disengagement of the toothed portion in the unlocked position, the segment gear head further defining a slot therethrough adapted to accommodate a stop pin therein, the slot being positioned in the segment gear head such that the stop pin abuts against a first end of the slot in the unlocked position and against a second end of the slot in the locked position;
- a reset lock spring operably coupled to the segment gear head to bias the segment gear head to the unlocked position; and
- a user interface coupled to the segment gear head to rotate the segment gear head between the locked and the unlocked positions.

10. The locking mechanism of claim 9, wherein the reset lock spring is positioned such that engagement of the toothed portion of the segment gear head with the gear train when the actuator is driving the device to a closed position results in rotation of the segment gear head against the bias applied by the reset lock spring.

11. The locking mechanism of claim 9, wherein the toothed portion of the segment gear head occupies approximately 25°.

12. The locking mechanism of claim 9, wherein the toothed portion is positioned in relation to the slot such that rotation of the gear train at a point of engagement with the locking mechanism is in a direction to rotate the segment gear head such that the stop pin engages the second end.

13. A spring return, motor driven rotary actuator for driving a flow control device to an open position under power and to a closed position upon loss of power, the actuator comprising:
- a motor;
- a speed reducing, torque multiplying gear train drivingly coupled to an output of the motor;
- an output coupling drivingly coupled to the gear train, the output coupling being driven in a first direction by the motor;
- a spring return mechanism including a torsion spring coupled to the gear train, the torsion spring being wound upon energization of the motor driving the output coupling in the first direction, the torsion spring unwinding upon motor de-energization to drive the output coupling through the drive train in a second direction;
- a manual override mechanism having a first user accessible interface, the manual override mechanism operating in conjunction with the spring return mechanism to allow manual positioning of the output coupling and winding of the torsion spring; and
- a manual locking mechanism having a second user accessible interface, the manual locking mechanism engaging the gear train to prevent rotation of the output coupling in the second direction.

14. The actuator of claim 13, wherein the motor kicks the output coupling in the first direction to disengage the locking mechanism from the gear train to allow rotation of the output coupling in the second direction.

15. The actuator of claim 13, wherein the manual locking mechanism includes a segment gear head having a toothed portion on a face thereof, the segment gear head being rotatable between a locked position wherein the toothed portion engages the gear train preventing rotation of the output coupling in the second direction, and an unlocked position wherein the toothed portion is disengaged from the gear train.

16. The actuator of claim 15, wherein the manual locking mechanism further includes a reset lock spring operatively coupled to the segment gear head to bias the segment gear head to the unlocked position.

17. The actuator of claim 16, wherein the segment gear head includes a slot adapted to accommodate a stop pin therethrough, the stop pin abutting against a first end of the slot in the locked position thereby preventing further rotation of the segment gear head.

18. The actuator of claim 16, wherein rotation of the gear train at a point of engagement with the locking mechanism under influence of the torsion spring is in a direction to rotate the segment gear head against the reset lock spring force thereby maintaining the manual locking mechanism in the locked position.

19. The actuator of claim 16, wherein rotation of the gear train at a point of engagement with the locking mechanism under influence of the motor is in a direction to rotate the segment gear head in accord with the reset lock spring force thereby aiding the manual locking mechanism to achieve the unlocked position.

* * * * *